US009643594B2

(12) United States Patent
Migita

(10) Patent No.: US 9,643,594 B2
(45) Date of Patent: May 9, 2017

(54) HYBRID CAR

(71) Applicant: TOYOTA JIDOSHA KABUSHIKI KAISHA, Toyota-shi, Aichi-ken (JP)

(72) Inventor: Tsubasa Migita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/933,845

(22) Filed: Nov. 5, 2015

(65) Prior Publication Data

US 2016/0129901 A1    May 12, 2016

(30) Foreign Application Priority Data

Nov. 7, 2014  (JP) .................................. 2014-227136

(51) Int. Cl.
| | |
|---|---|
| *B60K 6/365* | (2007.10) |
| *B60W 10/16* | (2012.01) |
| *B60K 6/445* | (2007.10) |
| *B60W 10/08* | (2006.01) |
| *B60W 10/06* | (2006.01) |
| *B60W 20/13* | (2016.01) |

(52) U.S. Cl.
CPC ............. *B60W 20/13* (2016.01); *B60K 6/365* (2013.01); *B60K 6/445* (2013.01); *B60W 10/06* (2013.01); *B60W 10/08* (2013.01); *B60W 10/16* (2013.01); *B60W 2710/06* (2013.01); *B60W 2710/08* (2013.01); *B60W 2710/12* (2013.01); *B60W 2720/26* (2013.01); *B60Y 2200/92* (2013.01);
(Continued)

(58) Field of Classification Search
CPC ...... B60W 20/13; B60W 10/06; B60W 10/08; B60W 10/16; B60W 2710/06; B60W 2710/08; B60W 2710/12; B60W 2720/26; B60K 6/365; B60K 3/445; B60Y 2200/92; Y02T 10/6239; Y02T 10/6265; Y02T 10/6286; Y10S 903/91; Y10S 903/93

See application file for complete search history.

(56) References Cited

U.S. PATENT DOCUMENTS

| | | | |
|---|---|---|---|
| 2012/0059540 A1* | 3/2012 | Ogura ................... | B60K 6/445 701/22 |
| 2015/0025728 A1* | 1/2015 | Hase ..................... | B60K 6/445 701/22 |

(Continued)

FOREIGN PATENT DOCUMENTS

| | | | |
|---|---|---|---|
| JP | 2005318780 A | * | 11/2005 |
| JP | 2007230384 A | * | 9/2007 |

(Continued)

*Primary Examiner* — Tuan C. To
(74) *Attorney, Agent, or Firm* — Oliff PLC

(57) ABSTRACT

A hybrid car includes an engine, a first motor, a first driving shaft connected to a first drive wheel, a planetary gear, a second motor, a battery, and an electronic control unit. The electronic control unit is configured to control the first motor and the second motor such that the hybrid car travels within a range of allowable input and output electric power of the battery. The electronic control unit is configured to set an upper limit driving force based on a balancing driving force commensurate with a dynamic frictional force between the first drive wheel and a road surface and control the engine, the first motor, and the second motor when an idling-slip of the drive wheel occurs such that a driving force equal to or less than the upper limit driving force is output to the first drive wheel.

7 Claims, 8 Drawing Sheets

(52) U.S. Cl.
CPC ........ *Y02T 10/6239* (2013.01); *Y02T 10/6265* (2013.01); *Y02T 10/6286* (2013.01); *Y10S 903/91* (2013.01); *Y10S 903/93* (2013.01)

(56) References Cited

U.S. PATENT DOCUMENTS

| | | | | |
|---|---|---|---|---|
| 2015/0139767 | A1* | 5/2015 | Moriki ................. | E02F 9/2066 |
| | | | | 414/699 |
| 2015/0149010 | A1* | 5/2015 | Matsui .................... | B60K 6/48 |
| | | | | 701/22 |
| 2015/0149064 | A1* | 5/2015 | Lim .................. | B60K 23/0808 |
| | | | | 701/110 |
| 2015/0298577 | A1* | 10/2015 | Kobayashi ............. | B60L 15/20 |
| | | | | 701/22 |
| 2016/0009311 | A1* | 1/2016 | Khale ................... | B62D 1/184 |
| | | | | 74/530 |
| 2016/0096446 | A1* | 4/2016 | Yamazaki ........... | B60L 15/2081 |
| | | | | 477/20 |
| 2016/0152143 | A1* | 6/2016 | Nakamura ............... | B60L 7/14 |
| | | | | 701/22 |
| 2016/0329856 | A1* | 11/2016 | Shoda ..................... | H02P 6/06 |

FOREIGN PATENT DOCUMENTS

| | | | |
|---|---|---|---|
| JP | 2007245805 A * | 9/2007 | |
| JP | 2008-207715 A | 9/2008 | |
| JP | 2009-126329 A | 6/2009 | |
| JP | 2009-165326 A | 7/2009 | |
| JP | 2009190564 A * | 8/2009 | |
| WO | 2013/076902 A1 | 5/2013 | |

* cited by examiner

HYBRID CAR

INCORPORATION BY REFERENCE

The disclosure of Japanese Patent Application No. 2014-227136 filed on Nov. 7, 2014 including the specification, drawings and abstract is incorporated herein by reference in its entirety.

BACKGROUND OF THE INVENTION

1. Field of the Invention

The invention relates to a hybrid car and, more particularly, to a hybrid car that is provided with an engine, a first motor capable of inputting and outputting power, a planetary gear having three rotating elements connected to a rotary shaft of the first motor, an output shaft of the engine, and a driving shaft connected to a drive wheel to be arranged in the order of the rotary shaft, the output shaft, and the driving shaft in a nomogram, a second motor capable of inputting and outputting power to and from the driving shaft via a reduction gear, and a battery capable of exchanging electric power with the first motor and the second motor.

2. Description of Related Art

A hybrid car that is provided with an engine, a first motor, a power distribution and integration mechanism (planetary gear mechanism) having a ring gear, a carrier, and a sun gear connected to a driving shaft connected to a drive wheel, an output shaft of the engine, and a rotary shaft of the first motor, a second motor capable of inputting and outputting power to and from the driving shaft, and a battery capable of exchanging electric power with the first motor and the second motor has been proposed as this type of hybrid car (refer to, for example, Japanese Patent Application Publication No. 2009-126329). When this hybrid car travels on power from the motors alone with traction control (TRC) OFF and a deviation that is obtained by subtracting a target slip velocity from a slip velocity exceeds a certain degree of value in a state where no slip occurs, the second motor is controlled so that torque that tends to decrease as the deviation increases is output from the second motor. Then, a certain degree of slip is allowed.

SUMMARY OF THE INVENTION

In a case where the above-described control is applied to this hybrid car when the idling-slip of the drive wheel occurs during power output from the engine, a torque command value for traveling and a power command value of the engine are reduced as a result of an increase in the slip velocity after the slip velocity increases to some extent. In this case, the engine has a relatively low level of responsiveness, and thus an actual power reduction is delayed with respect to the reduction in the power command value of the engine and a reduction in the electric power generated by the first motor is delayed. The delay in the reduction in the electric power generated by the first motor and an increase in the slip velocity (increase in a rotational speed of the second motor) cause an allowable lower limit of torque that may be output from the second motor to increase (absolute value decreasing, that is, approximating Value 0). This is to prevent the electric power that is input to the battery from exceeding allowable input electric power (input limit). For these reasons, a reduction in torque (power) of the second motor decreases and the slip velocity becomes less likely to comply with a target slip velocity. Accordingly, slip velocity control becomes less responsive.

The invention provides a hybrid car that has improved slip velocity control responsiveness.

A hybrid car according to an aspect of the invention includes an engine, a first motor, a first driving shaft, a planetary gear, a second motor, a battery, and an electronic control unit. The first motor is configured to input and output power. The first driving shaft is connected to a first drive wheel of the hybrid car. The planetary gear has three rotating elements. The three rotating elements are each connected to a rotary shaft of the first motor, an output shaft of the engine, and the first driving shaft such that the three rotating elements are arranged in an order of the rotary shaft of the first motor, the output shaft of the engine, and the first driving shaft in a nomogram of the planetary gear. The second motor is configured to input and output power to and from the first driving shaft. The battery is configured to exchange electric power with the first motor and the second motor. The electronic control unit is configured to control the first motor and the second motor such that the hybrid car travels within a range of allowable input and output electric power of the battery. The electronic control unit is configured to set a first upper limit driving force based on a first balancing driving force commensurate with a dynamic frictional force between the first drive wheel and a road surface and control the engine, the first motor, and the second motor when an idling-slip of the first drive wheel occurs such that a driving force equal to or less than the first upper limit driving force is output to the first drive wheel.

When the idling-slip of the first drive wheel occurs in the hybrid car according to this aspect, the first upper limit driving force is set based on the first balancing driving force commensurate with the dynamic frictional force between the first drive wheel and the road surface and the engine, the first motor, and the second motor are controlled such that a driving force equal to or less than the first upper limit driving force is output to the first drive wheel. In a case where the driving force that is output to the first drive wheel is quickly limited to the first upper limit driving force (before the slip velocity increases to some extent) as described above when the idling-slip of the first drive wheel occurs, torque of the second motor can be sufficiently reduced. Since the first upper limit driving force that is based on the first balancing driving force is used, the slip velocity of the first drive wheel can be appropriately stabilized.

In the hybrid car according to this aspect, the electronic control unit may be configured to set a sum of the first balancing driving force and a first correction driving force as the first upper limit driving force when the idling-slip of the first drive wheel occurs. The first correction driving force may be a driving force at which a first slip differential as a differential between a target slip velocity and a current slip velocity of the first drive wheel is canceled. In this case, the slip velocity of the first drive wheel is allowed to become stabilized around the target slip velocity.

In the hybrid car according to this aspect, the electronic control unit may be configured to control the engine, the first motor, and the second motor when an absolute value of the allowable input and output electric power is equal to or less than a predetermined value and the idling-slip of the first drive wheel occurs such that a driving force equal to or less than the first upper limit driving force is output to the first drive wheel.

The hybrid car according to this aspect may further include a third motor capable of inputting and outputting power to and from a second driving shaft connected to a second drive wheel other than the first drive wheel. The battery may be configured to exchange electric power with the third motor. The electronic control unit may be configured to control the engine, the first motor, the second motor, and the third motor such that the hybrid car travels within a range of maximum allowable input and output electric power of the battery. The electronic control unit may be configured to set a second upper limit driving force based on a second balancing driving force commensurate with a dynamic frictional force between the second drive wheel and the road surface and control the third motor when an idling-slip of the second drive wheel occurs such that a driving force equal to or less than the second upper limit driving force is output to the second drive wheel. Since the third motor is controlled by the use of the second upper limit driving force based on the second balancing driving force as described above, the slip velocity of the second drive wheel can be appropriately stabilized.

In the hybrid car according to this aspect that includes the third motor, the electronic control unit may be configured to set a sum of the second balancing driving force and a second correction driving force as the second upper limit driving force when the idling-slip of the second drive wheel occurs, the second correction driving force being a driving force at which a second slip differential as a differential between a target slip velocity and a current slip velocity of the second drive wheel is canceled.

In the hybrid car according to this aspect that includes the third motor, the electronic control unit may be configured to control the engine, the first motor, and the second motor when the absolute value of the allowable input and output electric power is equal to or less than a predetermined value and the idling-slip of the second drive wheel occurs such that a driving force equal to or less than the second upper limit driving force is output to the second drive wheel.

In the hybrid car according to this aspect that includes the third motor, the electronic control unit may be configured to control the engine, the first motor, the second motor, and the third motor when the idling-slip occurs in any one or both of the first drive wheel and the second drive wheel such that a distribution ratio regarding torque of the first drive wheel and torque of the second drive wheel is within an allowable range. In this case, a deviation of the distribution ratio regarding the torque of the first drive wheel and the torque of the second drive wheel from the allowable range can be suppressed. Herein, the "allowable distribution ratio range" may be a distribution ratio range that ensures a sufficient traveling performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
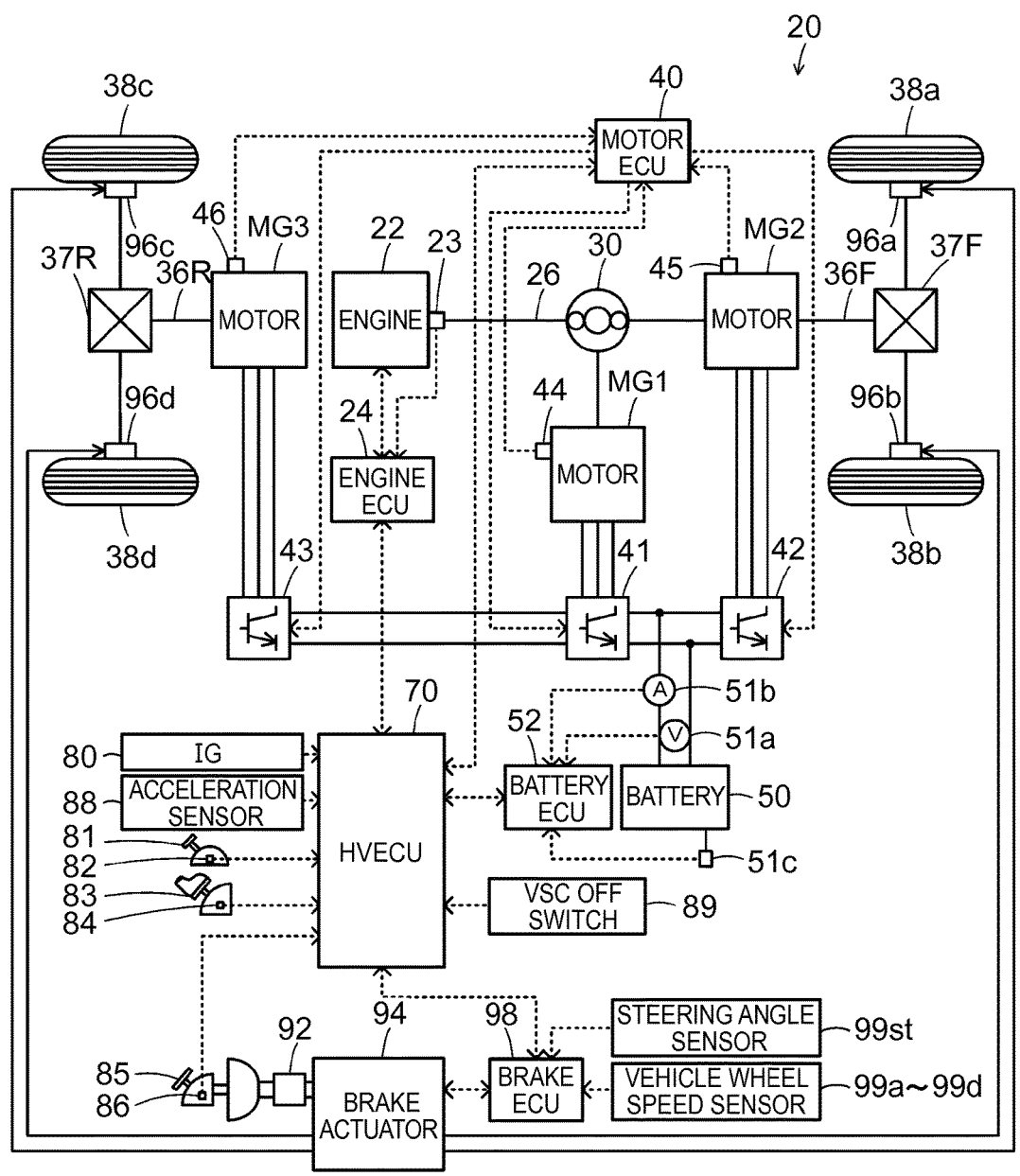
FIG. 1 is a configuration diagram illustrating a schematic configuration of a hybrid car 20 according to an embodiment of the invention.

FIG. 1 is a configuration diagram illustrating a schematic configuration of a hybrid car 20 as the embodiment of the invention. As illustrated in the drawing, the hybrid car 20 according to the embodiment is provided with an engine 22, a planetary gear 30, motors MG1, MG2, MG3, inverters 41, 42, 43, a battery 50, a brake actuator 94, and a hybrid electronic control unit (hereinafter, referred to as an HVECU) 70.

The engine 22 is configured as an internal combustion engine that outputs power by using gasoline, diesel oil, or the like as fuel. An operation of the engine 22 is controlled by an electronic control unit for an engine (hereinafter, referred to as an engine ECU) 24.

The engine ECU 24 is configured as a microprocessor (not illustrated) with a CPU at the center thereof and is provided with a ROM that stores a processing program, a RAM that temporarily stores data, I/O ports, and a communication port in addition to the CPU. Signals from various sensors that are required for controlling the operation of the engine 22 are input to the engine ECU 24 via the input port. Examples of these signals include a crank angle θcr from a crank position sensor 23 that detects a rotational position of a crankshaft 26. In addition, various control signals that are required for controlling the operation of the engine 22 are output from the engine ECU 24 via the output port. Example of these signals include a driving signal toward a fuel injection valve, a driving signal toward a throttle motor that adjusts a position of a throttle valve, and a control signal toward an ignition coil that is integrated with an igniter. The engine ECU 24 calculates a rotational speed of the crankshaft 26, that is, a rotational speed Ne of the engine 22 based on the crank angle θcr detected by the crank position sensor 23. The engine ECU 24 is connected to the HVECU 70 via the communication port. The engine ECU 24 controls the operation of the engine 22 by using a control signal from the HVECU 70. If necessary, the engine ECU 24 outputs data relating to operation states of the engine 22 to the HVECU 70.

The planetary gear 30 is configured as a single pinion-type planetary gear mechanism. A rotor of the motor MG1 is connected to a sun gear of the planetary gear 30. A driving shaft 36F, which is connected to front wheels 38a, 38b via a differential gear 37F, is connected to a ring gear of the planetary gear 30. The crankshaft 26 of the engine 22 is connected to a carrier of the planetary gear 30.

The motor MG1 is configured as, for example, a synchronous generator motor. As described above, the rotor of the motor MG1 is connected to the sun gear of the planetary gear 30. The motor MG2 is configured as, for example, a synchronous generator motor. A rotor of the motor MG2 is connected to the driving shaft 36F. The motor MG3 is configured as, for example, a synchronous generator motor. A driving shaft 36R, which is connected to rear wheels 38c, 38d via a differential gear 37R, is connected to the motor MG3. The motors MG1, MG2, MG3 are driven to rotate when switching elements (not illustrated) of the inverters 41, 42, 43 are switching-controlled by an electronic control unit for a motor (hereinafter, referred to as a motor ECU) 40.

The motor ECU 40 is configured as a microprocessor (not illustrated) with a CPU at the center thereof and is provided with a ROM that stores a processing program, a RAM that temporarily stores data, I/O ports, and a communication port in addition to the CPU. Signals from various sensors that are required for controlling the driving of the motors MG1, MG2, MG3 are input to the motor ECU 40 via the input port. Examples of these signals include rotational positions θm1, θm2, θm3 from rotational position detecting sensors 44, 45, 46 that detect rotational positions of the rotor of the motor MG1, the rotor of the motor MG2, and a rotor of the motor MG3 and a phase current from a current sensor that detects currents flowing through respective phases of the motors MG1, MG2, MG3. Switching control signals to the switching elements (not illustrated) of the inverters 41, 42, 43 and the like are output from the motor ECU 40 via the output port. The motor ECU 40 calculates rotational speeds Nm1, Nm2, Nm3 of the motors MG1, MG2, MG3 based on the rotational positions θm1, θm2, θm3 of the rotors of the motors MG1, MG2, MG3 detected by the rotational position detecting sensors 44, 45, 46. The motor ECU 40 is connected to the HVECU 70 via the communication port. The motor ECU 40 controls the driving of the motors MG1, MG2, MG3 by using a control signal from the HVECU 70. If necessary, the motor ECU 40 outputs data relating to driving states of the motors MG1, MG2, MG3 to the HVECU 70.

The battery 50 is configured as, for example, a lithium-ion secondary battery or a nickel-hydrogen secondary battery. The battery 50 exchanges electric power with the motors MG1, MG2, MG3 via the inverters 41, 42, 43. The battery 50 is managed by an electronic control unit for a battery (hereinafter, referred to as a battery ECU) 52.

Figure 2:
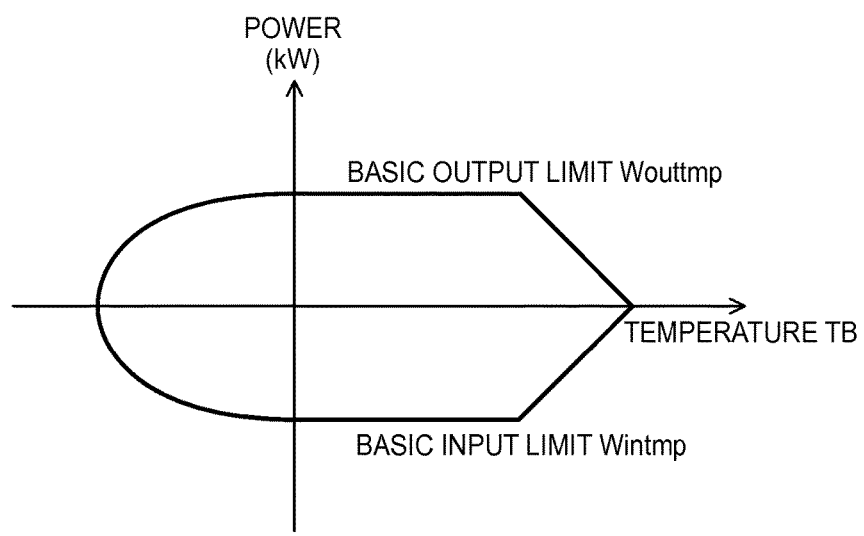
FIG. 2 is an explanatory drawing illustrating an example of a relationship between a battery temperature Tb of a battery 50 and basic input and output limits Wintmp, Wouttmp.
Figure 3:
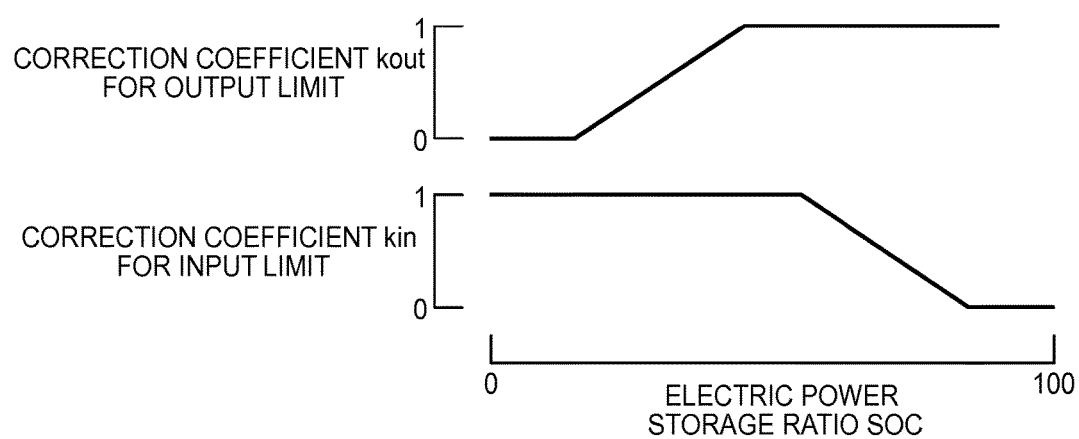
FIG. 3 is an explanatory drawing illustrating an example of a relationship between an electric power storage ratio SOC of the battery 50 and correction coefficients kin, kout for input and output limits.

The battery ECU 52 is configured as a microprocessor (not illustrated) with a CPU at the center thereof and is provided with a ROM that stores a processing program, a RAM that temporarily stores data, I/O ports, and a communication port in addition to the CPU. Signals that are required for managing the battery 50 are input to the battery ECU 52 via the input port. Examples of these signals include a battery voltage VB from a voltage sensor 51a that is disposed between terminals of the battery 50, a battery current IB from a current sensor 51b that is attached to an output terminal of the battery 50, and a battery temperature TB from a temperature sensor 51c that is attached to the battery 50. In order to manage the battery 50, the battery ECU 52 calculates an electric power storage ratio SOC, which is the ratio of the capacity of electric power that can be discharged from the battery 50 at that point in time to the total capacity, based on the integrated value of the battery current IB detected by the current sensor 51b and calculates input and output limits Win, Wout, which are allowable input and output electric power that can be used for charging and discharging of the battery 50, based on the calculated electric power storage ratio SOC and the battery temperature TB detected by the temperature sensor 51c. The input and output limits Win, Wout of the battery 50 can be set by setting basic input and output limits Wintmp, Wouttmp as base values of the input and output limits Win, Wout based on the battery temperature TB, setting correction coefficients kin, kout for input and output limits based on the electric power storage ratio SOC of the battery 50, and multiplying the correction coefficients kin, kout for input and output limits by the basic input and output limits Wintmp, Wouttmp. FIG. 2 illustrates an example of a relationship between the battery temperature Tb of the battery 50 and the basic input and output limits Wintmp, Wouttmp and FIG. 3 illustrates an example of a relationship between the electric power storage ratio SOC of the battery 50 and the correction coefficients kin, kout for input and output limits The battery ECU 52 is connected to the HVECU 70 via the communication port. If necessary, the battery ECU 52 outputs data relating to states of the battery 50 to the HVECU 70.

The brake actuator 94 is configured as an actuator that applies a braking force to the front wheels 38a, 38b and the rear wheels 38c, 38d. Specifically, the brake actuator 94 is configured to be capable of setting a braking force that acts on a vehicle in accordance with the pressure (brake pressure) of a master cylinder 92 generated in response to the depression of a brake pedal 85 and a vehicle body speed Vc and to be capable of adjusting the hydraulic pressure of brake wheel cylinders 96a, 96b, 96c, 96d so that a portion of the braking force that is borne by the brake acts on the front wheels 38a, 38b and the rear wheels 38c, 38d or adjusting the hydraulic pressure on the brake wheel cylinders 96a, 96b, 96c, 96d so that the braking force acts on the front wheels 38a, 38b and the rear wheels 38c, 38d regardless of the depression of the brake pedal 85. The driving of the brake actuator 94 is controlled by an electronic control unit for a brake (hereinafter, referred to as a brake ECU) 98.

The brake ECU 98 is configured as a microprocessor (not illustrated) with a CPU at the center thereof and is provided with a ROM that stores a processing program, a RAM that temporarily stores data, I/O ports, and a communication port in addition to the CPU. Signals from various sensors that are required for controlling the driving of the brake actuator 94 are input to the brake ECU 98 via the input port. Examples of these signals include a master cylinder pressure (brake pedal force Fb) that is detected by a pressure sensor (not illustrated) which is attached to the master cylinder 92, vehicle wheel speeds Vwa to Vwd from vehicle wheel speed sensors 99a to 99d that are attached to the front wheels 38a, 38b and the rear wheels 38c, 38d, and a steering angle θst from a steering angle sensor 99st. A driving control signal toward the brake actuator 94 and the like are output from the brake ECU 98 via the output port. The brake ECU 98 is connected to the HVECU 70 via the communication port. The brake ECU 98 controls the driving of the brake actuator 94 by using a control signal from the HVECU 70. If necessary, the brake ECU 94 outputs data relating to states of the brake actuator 94 to the HVECU 70. With the signals such as the vehicle wheel speeds Vwa to Vwd of the front wheels 38a, 38b and the rear wheels 38c, 38d from the vehicle wheel speed sensors 99a to 99d and the steering angle θst from the steering angle sensor 99st input, the brake ECU 98 performs vehicle behavior stability control, examples of which include an anti-lock brake system function (ABS) for preventing any of the front wheels 38a, 38b and the rear wheels 38c, 38d from lock-slipping when the brake pedal 85 is depressed by a driver, traction control (TRC) for preventing any of the front wheels 38a, 38b from idling-slipping when an accelerator pedal 83 is depressed by the driver, and postural maintenance control (VSC) for postural maintenance during turning of the vehicle.

The HVECU 70 is configured as a microprocessor (not illustrated) with a CPU at the center thereof and is provided with a ROM that stores a processing program, a RAM that temporarily stores data, I/O ports, and a communication port in addition to the CPU. An ignition signal from an ignition switch 80, a shift position SP from a shift position sensor 82 that detects an operation position of a shift lever 81, an accelerator opening degree Acc from an accelerator pedal position sensor 84 that detects the amount of depression of the accelerator pedal 83, a brake pedal position BP from a brake pedal position sensor 86 that detects the amount of depression of the brake pedal 85, a vehicle body acceleration ac from an acceleration sensor 88, a switch signal from a postural maintenance control OFF switch (hereinafter, referred to as a VSC OFF switch) 89, and the like are input to the HVECU 70 via the input port. The HVECU 70 calculates the vehicle body speed Vc based on the integrated value of the vehicle body acceleration ac detected by the acceleration sensor 88. As described above, the HVECU 70 is connected to the engine ECU 24, the motor ECU 40, and the battery ECU 52 via the communication ports and exchanges various control signals and data with the engine ECU 24, the motor ECU 40, and the battery ECU 52.

The hybrid car 20 according to the embodiment that has the configuration described above travels in a hybrid traveling mode (HV traveling mode) in which the traveling is based on the operation of the engine 22 and an electric traveling mode (EV traveling mode) in which the traveling is performed with the operation of the engine 22 stopped.

Figure 4:
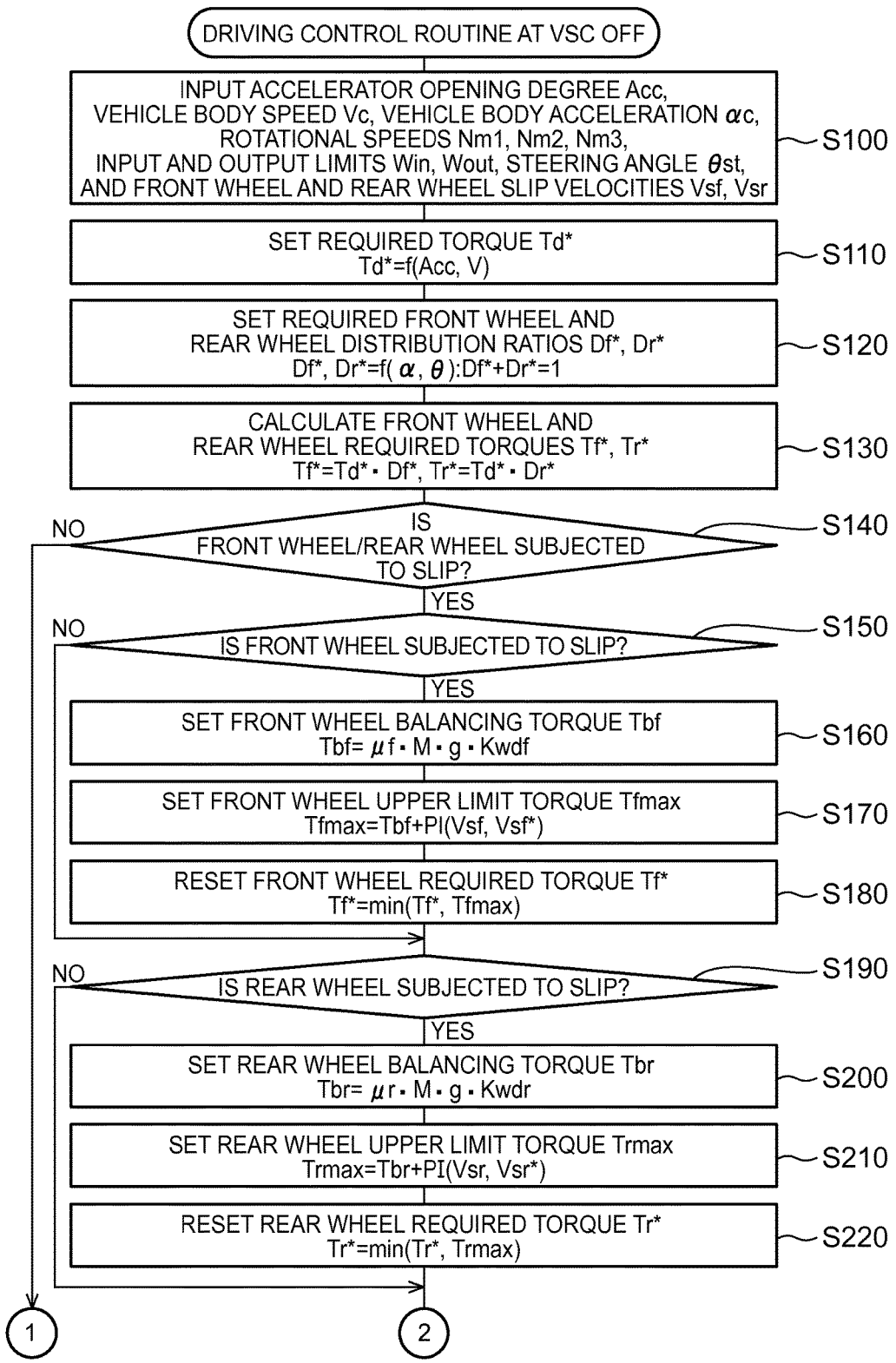
FIG. 4 is the first half of a flowchart illustrating an example of a driving control routine at VSC OFF that is executed by an HVECU 70 according to the embodiment.
Figure 5:
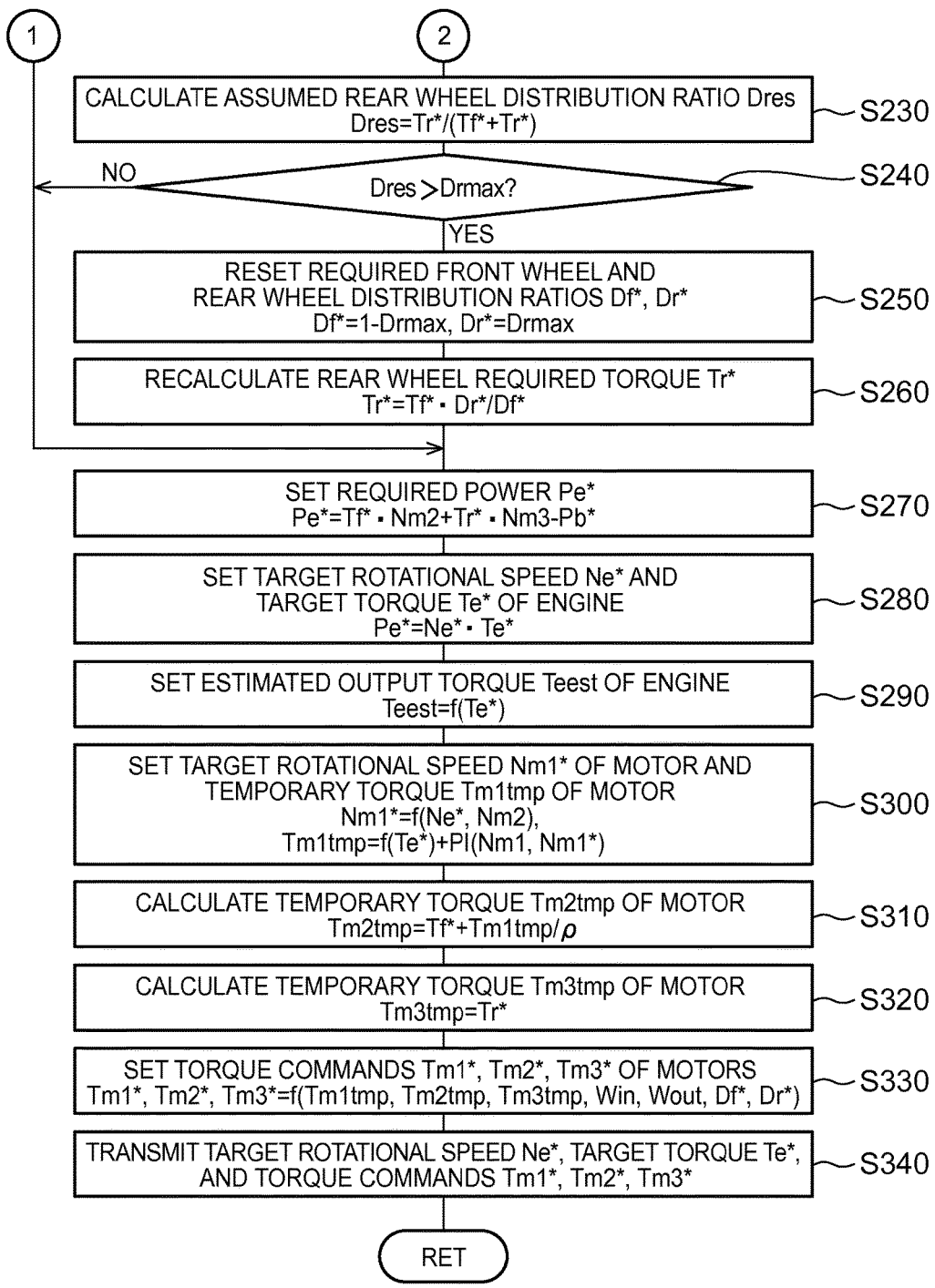
FIG. 5 is the latter half of the flowchart illustrating the example of the driving control routine at VSC OFF that is executed by the HVECU 70 according to the embodiment.

Hereinafter, an operation of the hybrid car 20 according to the embodiment that has this configuration, an operation in a case where the absolute values of the input and output limits Win, Wout of the battery 50 are sufficiently low and the VSC OFF switch 89 is ON (postural maintenance control (VSC) not performed) as at a low temperature in particular, will be described. FIGS. 4 and 5 are flowcharts illustrating an example of a driving control routine at VSC OFF that is executed by the HVECU 70 according to the embodiment. This routine is repeatedly executed at predetermined time intervals (for example, every few msec) when the absolute values of the input and output limits Win, Wout of the battery 50 are equal to or less than a threshold Wref (for example, 2 kW or 3 kW) and the VSC OFF switch 89 is OFF.

When the driving control routine at VSC OFF is executed, the HVECU 70 first inputs data such as the accelerator opening degree Acc from the accelerator pedal position sensor 84, the vehicle body acceleration ac from the acceleration sensor 88, the vehicle body speed Vc, the rotational speeds Nm1, Nm2, Nm3 of the motors MG1, MG2, MG3, the input and output limits Win, Wout of the battery 50, the steering angle θst, a front wheel slip velocity Vsf, and a rear wheel slip velocity Vsr (Step S100).

A value that is calculated based on the vehicle body acceleration ac which is detected by the acceleration sensor 88 is input as the vehicle body speed Vc. Values that are calculated based on the rotational positions θm1, θm2, θm3 of the rotors of the motors MG1, MG2, MG3 which are detected by the rotational position detecting sensors 44, 45, 46 are input, by communication from the motor ECU 40, as the rotational speeds Nm1, Nm2, Nm3 of the motors MG1, MG2, MG3. Values that are set based on the battery temperature TB which is detected by the temperature sensor 51c and the electric power storage ratio SOC of the battery 50 based on the integrated value of the battery current IB which is detected by the current sensor 51b are input, by communication from the battery ECU 52, as the input and output limits Win, Wout of the battery 50. A value that is detected by the steering angle sensor 99st is input, by communication from the brake ECU 98, as the steering angle θst. A value that is obtained by subtracting the vehicle body speed Vc from a value Vcf which is obtained by converting an average value Vwf of the vehicle wheel speeds Vwa, Vwb of the front wheels 38a, 38b into a vehicle body speed is input as the front wheel slip velocity Vsf. A value that is obtained by subtracting the vehicle body speed Vc from a value Vcr which is obtained by converting an average value Vwr of the vehicle wheel speeds Vwc, Vwd of the rear wheels 38c, 38d into a vehicle body speed is input as the rear wheel slip velocity Vsr. Values that are detected by the vehicle wheel speed sensors 99a to 99d are input, by communication from the brake ECU 98, as the vehicle wheel speeds Vwa to Vwd of the front wheels 38a, 38b and the rear wheels 38c, 38d.

Figure 6:
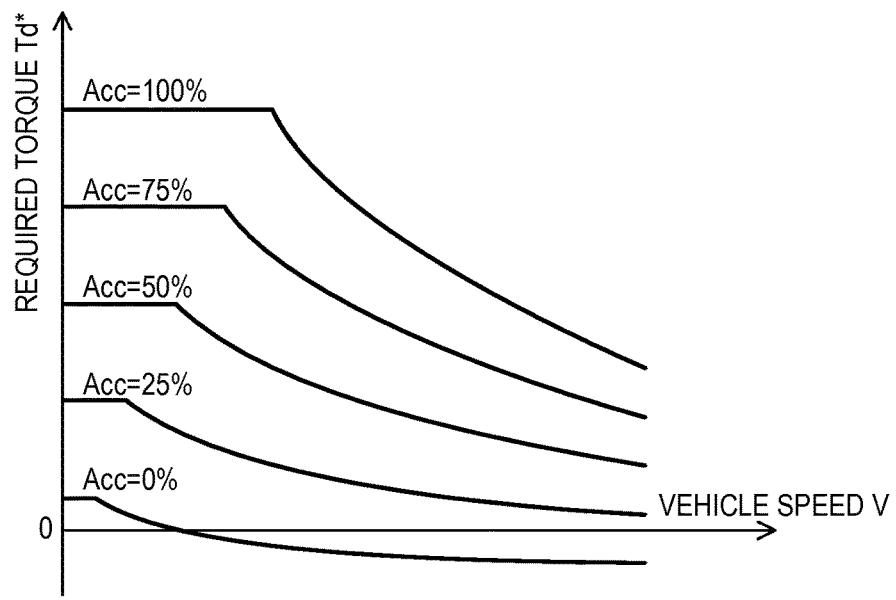
FIG. 6 is an explanatory drawing illustrating an example of a required torque setting map.

After the input of the data, a required torque Td* that is required for the traveling is set based on the input accelerator opening degree Acc and the input vehicle body speed Vc (Step S110). In this embodiment, a relationship among the accelerator opening degree Acc, the vehicle body speed Vc, and the required torque Td* is determined in advance and is stored in the ROM (not illustrated) as a required torque setting map, and the required torque Td* is set by the correlated required torque Td* being derived from the stored map when the accelerator opening degree Acc and the vehicle body speed Vc are given. An example of the required torque setting map is illustrated in FIG. 6.

Then, a required front wheel distribution ratio Df* and a required rear wheel distribution ratio Dr* are set based on the vehicle body acceleration ac and the steering angle θst (Step S120). The required front wheel distribution ratio Df* and the required rear wheel distribution ratio Dr* are required values of the ratio Df of the torque of the front wheels 38a, 38b and the ratio Dr of the torque of the rear wheels 38c, 38d (hereinafter, referred to as front wheel and rear wheel distribution ratios) to the sum of the torque of the front wheels 38a, 38b and the torque of the rear wheels 38c, 38d, respectively. The sum of the required front wheel distribution ratio Df* and the required rear wheel distribution ratio Dr* is Value 1. In this embodiment, the required front wheel distribution ratio Df* and the required rear wheel distribution ratio Dr* are set for the required rear wheel distribution ratio Dr* to have a tendency to increase (required front wheel distribution ratio Df* decreasing) as the vehicle body acceleration ac increases and for the required rear wheel distribution ratio Dr* to have a tendency to increase (required front wheel distribution ratio Df* decreasing) as the absolute value of the steering angle θst increases within a range in which the required rear wheel distribution ratio Dr* is equal to or less than a maximum rear wheel distribution ratio Drmax. The required front wheel distribution ratio Df* and the required rear wheel distribution ratio Dr* are set to have the tendencies described above so that traveling performances during acceleration and turning are improved. The maximum rear wheel distribution ratio Drmax is an upper limit of the rear wheel distribution ratio Dr* that ensures a sufficient traveling performance. The maximum rear wheel distribution ratio Drmax can be determined based on, for example, a front wheel static load distribution ratio Kwsf and a rear wheel static load distribution ratio Kwsr, which are the ratio of the mass acting on the front wheels 38a, 38b and the ratio of the mass acting on the rear wheels 38c, 38d when the vehicle is stationary to the mass M of the vehicle. Examples of the maximum rear wheel distribution ratio Drmax can include 0.55, 0.60, and 0.65.

After the setting of the required front wheel distribution ratio Df* and the required rear wheel distribution ratio Dr* as described above, a front wheel required torque Tf* that is required for the front wheels 38a, 38b is calculated by multiplying the required front wheel distribution ratio Df* by the required torque Td* and a rear wheel required torque Tr* that is required for the rear wheels 38c, 38d is calculated by multiplying the required rear wheel distribution ratio Dr* by the required torque Td* (Step S130).

Then, it is determined whether or not one or both of the front wheels 38a, 38b and the rear wheels 38c, 38d are subjected to idling-slip (Step S140). The determination as to whether or not the front wheels 38a, 38b are subjected to idling-slip is performed based on a comparison between the front wheel slip velocity Vsf and a threshold Vsfref. Examples of the threshold Vsfref can include 1 km/h, 2 km/h, and 3 km/h. The determination as to whether or not the rear wheels 38c, 38d are subjected to idling-slip is performed based on a comparison between the rear wheel slip velocity Vsr and a threshold Vsrref. Examples of the threshold Vsrref can include 1 km/h, 2 km/h, and 3 km/h.

When it is determined in Step S140 that none of the front wheels 38a, 38b and the rear wheels 38c, 38d is subjected to idling-slip, a required power Pe* that is required for the engine 22 is calculated, as shown in the following Equation (1), by subtracting a charging and discharging required power Pb* (positive value during discharging of the battery 50) of the battery 50 from the sum of a value (Tf*·Nm2) that is obtained by multiplying the rotational speed Nm2 of the motor MG2 (rotational speed of the driving shaft 36F) by the front wheel required torque Tf* and a value (Tr*·Nm3) that is obtained by multiplying the rotational speed Nm3 of the motor MG3 (rotational speed of the driving shaft 36R) by the rear wheel required torque Tr* (Step S270). The value (Tf*·Nm2) means the power that is required for the front wheels 38a, 38b and the value (Tr*·Nm3) means the power that is required for the rear wheels 38c, 38d.

$$Pe^*=Tf^*\cdot Nm2+Tr^*\cdot Nm3-Pb^* \tag{1}$$

Figure 7:
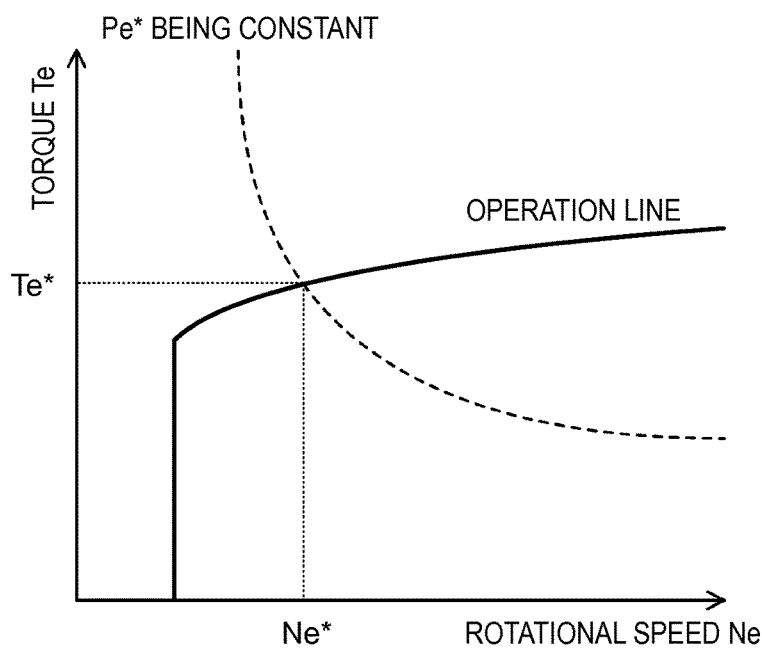
FIG. 7 is an explanatory drawing illustrating an example of an operation line of an engine 22 and how a target rotational speed Ne* and a target torque Te* are set.

After the calculation of the required power Pe* of the engine 22 as described above, a target rotational speed Ne* and a target torque Te* of the engine 22 are set based on the calculated required power Pe* and an operation line for an efficient operation of the engine 22 (Step S280). FIG. 7 is an explanatory drawing illustrating an example of the operation line of the engine 22 and how the target rotational speed Ne* and the target torque Te* are set. As illustrated in the drawing, the target rotational speed Ne* and the target torque Te* of the engine 22 can be obtained as a point of intersection between the operation line of the engine 22 and a curve on which the required power Pe* is constant (equal power line of the required power Pe*).

After the setting of the target torque Te* of the engine 22 as described above, a response delay compensation (dead time compensation and primary delay compensation) is performed on the target torque Te* of the engine 22 and an estimated output torque Teest as an estimated value of a torque Te of the engine 22 is set (Step S290). The response delay compensation for the target torque Te* of the engine 22 is a compensation that is performed on the target torque Te* by the use of a value determined in advance in an experiment, analysis, or the like as the degree of a response delay (dead time and primary delay) with respect to the target torque Te* of the torque from the engine 22.

Figure 8:
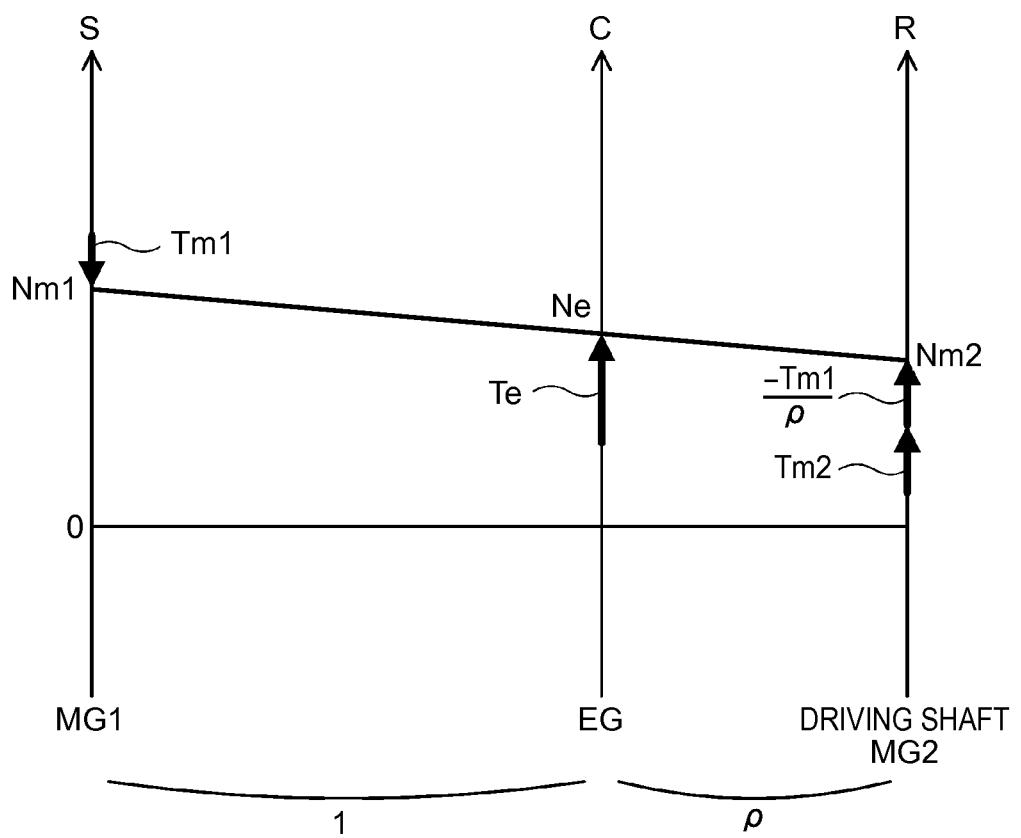
FIG. 8 is an explanatory drawing illustrating an example of a nomogram that shows a mechanical relationship between a rotational speed and torque pertaining to a rotating element of a planetary gear 30 during traveling in an HV traveling mode.

Then, a target rotational speed Nm1* of the motor MG1 is calculated based on the following Equation (2) and by the use of the target rotational speed Ne* of the engine 22, the rotational speed Nm2 of the motor MG2 (rotational speed of the driving shaft 36F), and a gear ratio ρ of the planetary gear 30 and a temporary torque Tm1tmp as a provisional value of a torque command Tm1* of the motor MG1 is calculated based on Equation (2) and by the use of the calculated target rotational speed Nm1*, the current rotational speed Nm1 of the motor MG1, the target torque Te* of the engine 22, and the gear ratio ρ of the planetary gear 30 (Step S300). Equation (2) is a dynamic relational expression as to a rotating element of the planetary gear 30. FIG. 8 is an explanatory drawing illustrating an example of a nomogram that shows a mechanical relationship between a rotational speed and torque pertaining to the rotating element of the planetary gear 30 during traveling in the HV traveling mode. In the drawing, the S axis in the left represents the rotational speed of the sun gear that is the rotational speed Nm1 of the motor MG1, the C axis represents the rotational speed of the carrier that is the rotational speed Ne of the engine 22, and the R axis represents the rotational speed of the ring gear (driving shaft 36F) that is the rotational speed Nm2 of the motor MG2. In the drawing, the two bold arrows on the R axis represent torque that is output from the motor MG1 and acts on the driving shaft 36F via the planetary gear 30 and torque that is output from the motor MG2 and acts on the driving shaft 36F. Equation (2) can be easily derived when this nomogram is used. Equation (3) is a relational expression as to feedback control for rotating the motor MG1 at the target rotational speed Nm1* (rotating the engine 22 at the target rotational speed Ne*). In Equation (3), the first term on the right-hand side is a feedforward term and the second and third terms on the right-hand side are proportional and integral terms of a feedback term. In Equation (3), "kpn" in the second term on the right-hand side is a proportional term gain and "kin" in the third term on the right-hand side is an integral term gain.

$$Nm1^*=Ne^*\cdot(1+\rho)\rho-Nm2/\rho \tag{2}$$

$$Tm1tmp=-\rho\cdot Te^*/(1+\rho)+kpn\cdot(Nm1^*-Nm1)+kin\cdot\int(Nm1^*-Nm1)dt \tag{3}$$

Then, a value that is obtained by dividing the temporary torque Tm1tmp of the motor MG1 by the gear ratio ρ of the planetary gear 30 is added to the front wheel required torque Tf* and a temporary torque Tm2tmp as a provisional value of a torque command Tm2* of the motor MG2 is calculated as shown in the following Equation (4) (Step S310). Then, the rear wheel required torque Tr* is set to a temporary torque Tm3tmp as a provisional value of a torque command Tm3* of the motor MG3 (Step S320). Equation (4) can be easily derived when the nomogram according to FIG. 6 is used.

$$Tm2tmp=Tf^*+Tm1tmp/\rho \tag{4}$$

After the setting of the temporary torques Tm1tmp, Tm2tmp, Tm3tmp of the motors MG1, MG2, MG3 as described above, the torque commands Tm1*, Tm2*, Tm3* are set by the temporary torques Tm1tmp, Tm2tmp, Tm3tmp of the motors MG1, MG2, MG3 being limited (corrected if necessary) so that an electric power condition allowing a total electric power consumption Pm of the motors MG1, MG2, MG3 to be within a range of the input and output limits Win, Wout of the battery 50 and a distribution ratio condition allowing the front wheel and rear wheel distribution ratios with regard to the torque (−Tm1*/ρ+Tm2*) of the front wheels 38a, 38b and the torque (Tm3*) of the rear wheels 38c, 38d to be the required front wheel and rear wheel distribution ratios Df*, Dr* are satisfied (Step S330).

The total electric power consumption Pm of the motors MG1, MG2, MG3 is calculated as the sum of electric power consumption Pm1, Pm2, Pm3 of the motors MG1, MG2, MG3. The electric power consumption Pm1 of the motor MG1 is calculated as a product of the torque command Tm1* and the rotational speed Nm1 of the motor MG1. The electric power consumption Pm2 of the motor MG2 is calculated as a product of the torque command Tm2* and the rotational speed Nm2 of the motor MG2. The electric power consumption Pm3 of the motor MG3 is calculated as a product of the torque command Tm3* and the rotational speed Nm3 of the motor MG3. As shown in FIG. 8, the motor MG1 outputs torque for restraining the rotational speed of the engine 22. Accordingly, the electric power consumption Pm1 of the motor MG1 has a negative value (electric power generation-side value) in a case where the rotational speed Nm1 of the motor MG1 is positive.

In this processing of Step S330, the temporary torques Tm1tmp, Tm2tmp, Tm3tmp are set to the torque commands Tm1*, Tm2*, Tm3* when a temporary total electric power consumption Pmtmp of the motors MG1, MG2, MG3, which is calculated on the assumption that the temporary torques Tm1tmp, Tm2tmp, Tm3tmp of the motors MG1, MG2, MG3 are set to the torque commands Tm1*, Tm2*, Tm3*, is within the range of the input and output limits Win, Wout of the battery 50. When the temporary total electric power consumption Pmtmp is out of the range of the input and output limits Win, Wout of the battery 50, the torque commands Tm1*, Tm2*, Tm3* are set with the temporary torques Tm1tmp, Tm2tmp, Tm3tmp corrected so that the electric power condition and the distribution ratio condition are satisfied. Specifically, the temporary torque Tm1tmp of the motor MG1 is set first to the torque command Tm1*. Then, torque limits Tm3min, Tm3max as upper and lower limits of the torque that may be output from the motor MG3 are calculated by dividing a value that is obtained by subtracting the electric power consumption Pm1 of the motor MG1 from the input and output limits Win, Wout of the battery 50 by the rotational speed Nm3 of the motor MG3 as shown in the following Equations (5), (6). Then, the torque command Tm3* is set by the temporary torque Tm3tmp of the motor MG3 being limited by the torque limits Tm3min, Tm3max. Then, torque limits Tm2min, Tm2max as upper and lower limits of the torque that may be output from the motor MG2 are calculated by dividing a value that is obtained by subtracting the electric power consumption Pm1, Pm3 of the motors MG1, MG3 from the input and output limits Win, Wout of the battery 50 by the rotational speed Nm2 of the motor MG2 as shown in the following Equations (7), (8). Then, the torque command Tm2* is set by the temporary torque Tm2tmp of the motor MG2 being limited by the torque limits Tm2min, Tm2max.

$$Tm3\text{min}=(Win-Pm1)/Nm3 \quad (5)$$

$$Tm3\text{max}=(Wout-Pm1)/Nm3 \quad (6)$$

$$Tm2\text{min}=(Win-Pm1-Pm3)/Nm2 \quad (7)$$

$$Tm2\text{max}=(Wout-Pm1-Pm3)/Nm2 \quad (8)$$

After the setting of the target rotational speed Ne* and the target torque Te* of the engine 22 and the torque commands Tm1*, Tm2*, Tm3* of the motors MG1, MG2, MG3 as described above, the target rotational speed Ne* and the target torque Te* of the engine 22 are transmitted to the engine ECU 24 and the torque commands Tm1*, Tm2*, Tm3* of the motors MG1, MG2, MG3 are transmitted to the motor ECU 40 (Step S340). Then, this routine is terminated. Upon receiving the target rotational speed Ne* and the target torque Te* of the engine 22, the engine ECU 24 performs intake air amount control, fuel injection control, ignition control, and the like for the engine 22 so that the engine 22 is operated based on the target rotational speed Ne* and the target torque Te*. Upon receiving the torque commands Tm1*, Tm2*, Tm3* of the motors MG1, MG2, MG3, the motor ECU 40 performs switching control for the switching elements of the inverters 41, 42, 43 so that the motors MG1, MG2, MG3 are driven based on the torque commands Tm1*, Tm2*, Tm3*.

When it is determined in Step S140 that at least one of the front wheels 38a, 38b and the rear wheels 38c, 38d is subjected to idling-slip, it is determined whether or not the front wheels 38a, 38b are subjected to idling-slip (Step S150). When it is determined that the front wheels 38a, 38b are subjected to idling-slip, a front wheel balancing torque Tbf commensurate with a dynamic frictional force between the front wheels 38a, 38b and a road surface is calculated as a product of a dynamic friction coefficient μf between the front wheels 38a, 38b and the road surface, the mass M of the vehicle, a gravitational acceleration g, and a front wheel dynamic load distribution ratio Kwdf that is the ratio of the mass acting on the front wheels 38a, 38b to the mass M of the vehicle as shown in the following Equation (9) (Step S160). The dynamic friction coefficient μf can be calculated based on, for example, the torque (−Tm1*/ρ+Tm2*) that is output to the front wheels 38a, 38b and the rotational speed Nm2 of the motor MG2 (rotational speed of the driving shaft 36F). The sum of the front wheel dynamic load distribution ratio Kwdf and a rear wheel dynamic load distribution ratio Kwdr, which is the ratio of the mass acting on the rear wheels 38c, 38d to the mass M of the vehicle, is Value 1. The front wheel dynamic load distribution ratio Kwdf and the rear wheel dynamic load distribution ratio Kwdr can be calculated based on, for example, the front wheel static load distribution ratio Kwsf and the rear wheel static load distribution ratio Kwsr, which are the ratio of the mass acting on the front wheels 38a, 38b and the ratio of the mass acting on the rear wheels 38c, 38d when the vehicle is stationary to the mass M of the vehicle, and the vehicle body acceleration αc. The sum of the front wheel static load distribution ratio Kwsf and the rear wheel static load distribution ratio Kwsr is Value 1. The front wheel static load distribution ratio Kwsf and the rear wheel static load distribution ratio Kwsr are, for example, 0.6 and 0.4, respectively.

$$Tbf=\mu f\cdot M\cdot g\cdot Kwdf \quad (9)$$

Then, a front wheel upper limit torque Tfmax is calculated based on the following Equation (10) and by the use of the front wheel balancing torque Tbf, the front wheel slip velocity Vsf, and a target front wheel slip velocity Vsf* (Step S170) and the front wheel required torque Tf* is reset by the front wheel required torque Tf* set in Step S130 being limited (upper limit guard) by the front wheel upper limit torque Tfmax (Step S180). Examples of the target front wheel slip velocity Vsf* can include 25 km/h, 30 km/h, and 35 km/h. Equation (10) is a relational expression as to feedback control for approximating the front wheel slip velocity Vsf to the target front wheel slip velocity Vsf*. In Equation (10), the first term on the right-hand side is a feedforward term and the second and third terms on the right-hand side are proportional and integral terms of a feedback term. In Equation (10), "kpsf" in the second term on the right-hand side is a proportional term gain and "kisf" in the third term on the right-hand side is an integral term gain. In the embodiment, relatively low values are used as the proportional and integral term gains kpsf, kisf. Accordingly, immediately after the initiation of the idling-slip of the front wheels 38a, 38b, the front wheel upper limit torque Tfmax is a value that is approximately equal to the front wheel balancing torque Tbf since the impact of the feedback term (integral term in particular) is sufficiently small. Then, the front wheel upper limit torque Tfmax becomes a value that smoothly approximates a differential between the target front wheel slip velocity Vsf* and the front wheel slip velocity Vsf(Vsf*−Vsf) to Value 0 as the impact of the feedback term (integral term in particular) smoothly increases. Specifically, values that allow power Pe of the engine 22 to comply sufficiently with a change in the front wheel required torque Tf* (required power Pe* of the engine 22) are used as the proportional and integral term gains kpsf, kisf. Basically, the motors MG1, MG2 are more responsive than the engine 22, and thus the motors MG1, MG2 are compliable when the engine 22 is compliable.

$$Tfmax=Tbf+kpsf\cdot(Vsf^*-Vsf)+kisf\cdot\int(Vsf^*-Vsf)dt \qquad (10)$$

When it is determined in Step S150 that the front wheels 38a, 38b are not subjected to idling-slip, the processing of Steps S160 to S180 are not executed. In other words, the front wheel required torque Tf* is not reset.

Then, it is determined whether or not the rear wheels 38c, 38d are subjected to idling-slip (Step S190). When it is determined that the rear wheels 38c, 38d are subjected to idling-slip, a rear wheel balancing torque Tbr commensurate with a dynamic frictional force between the rear wheels 38c, 38d and the road surface is calculated as a product of a dynamic friction coefficient μr between the rear wheels 38c, 38d and the road surface, the mass M of the vehicle, the gravitational acceleration g, and the rear wheel dynamic load distribution ratio Kwdr as shown in the following Equation (11) (Step S200). The dynamic friction coefficient μr can be calculated based on, for example, the torque (Tm3\*) that is output to the rear wheels 38c, 38d and the rotational speed Nm3 of the motor MG3 (rotational speed of the driving shaft 36R).

$$Tbr=\mu r\cdot M\cdot g\cdot Kwdr \qquad (11)$$

Then, a rear wheel upper limit torque Trmax is calculated based on the following Equation (12) and by the use of the rear wheel balancing torque Tbr, the rear wheel slip velocity Vsr, and a target rear wheel slip velocity Vsr* (Step S210) and the rear wheel required torque Tr* is reset by the rear wheel required torque Tr* set in Step S130 being limited (upper limit guard) by the rear wheel upper limit torque Trmax (Step S220). Examples of the target rear wheel slip velocity Vsr* can include 25 km/h, 30 km/h, and 35 km/h. Equation (12) is a relational expression as to feedback control for approximating the rear wheel slip velocity Vsr to the target rear wheel slip velocity Vsr*. In Equation (12), the first term on the right-hand side is a feedforward term and the second and third terms on the right-hand side are proportional and integral terms of a feedback term. In Equation (12), "kpsr" in the second term on the right-hand side is a proportional term gain and "kisr" in the third term on the right-hand side is an integral term gain. In the embodiment, relatively low values are used as the proportional and integral term gains kpsr, kisr. Accordingly, immediately after the initiation of the idling-slip of the rear wheels 38c, 38d, the rear wheel upper limit torque Trmax is a value that is approximately equal to the rear wheel balancing torque Tbr since the impact of the feedback term (integral term in particular) is sufficiently small. Then, the rear wheel upper limit torque Trmax becomes a value that smoothly approximates a differential between the target rear wheel slip velocity Vsr* and the rear wheel slip velocity Vsr(Vsr*−Vsr) to Value 0 as the impact of the feedback term (integral term in particular) smoothly increases. Specifically, values that are approximately equal to the proportional and integral term gains kpsf, kisf described above are used as the proportional and integral term gains kpsr, kisr in view of travelability, postural stability, and the like.

$$Trmax=Tbr+kpsr\cdot(Vsr^*-Vsr)+kisr\cdot\int(Vsr^*-Vsr)dt \qquad (12)$$

When it is determined in Step S190 that the rear wheels 38c, 38d are not subjected to idling-slip, the processing of Steps S200 to S220 are not executed. In other words, the rear wheel required torque Tr* is not reset.

Then, as shown in the following Equation (13), an assumed rear wheel distribution ratio Dres is calculated by dividing the rear wheel required torque Tr* by the sum of the front wheel required torque Tf* and the rear wheel required torque Tr* (Step S230) and the calculated assumed rear wheel distribution ratio Dres is compared to the maximum rear wheel distribution ratio Drmax (Step S240). Then, a value that is obtained by subtracting the maximum rear wheel distribution ratio Drmax from Value 1 is reset to the required front wheel distribution ratio Df* and the maximum rear wheel distribution ratio Drmax is reset to the required rear wheel distribution ratio Dr* (Step S250) when the assumed rear wheel distribution ratio Dres exceeds the maximum rear wheel distribution ratio Drmax. Then, as shown in the following Equation (14), the rear wheel required torque Tr* is reset (Step S260) by multiplying the front wheel required torque Tf* by the maximum rear wheel distribution ratio Drmax and dividing this by the required front wheel distribution ratio Df*. The processing of Steps S250, S260 is not executed when the assumed rear wheel distribution ratio Dres is equal to or less than the maximum rear wheel distribution ratio Drmax. The processing of Step S260 is to reset the rear wheel required torque Tr* so that the front wheel distribution ratio and the rear wheel distribution ratio become Value (1−Drmax) and the maximum rear wheel distribution ratio Drmax, respectively. Basically, the assumed rear wheel distribution ratio Dres becomes a value that differs from the required rear wheel distribution ratio Dr* when the front wheel required torque Tf* is reset through the processing of Steps S160 to S180 described above or the rear wheel required torque Tr* is reset through the processing of Steps S200 to S220. Accordingly, a sufficient traveling performance can be ensured by allowing the rear wheel distribution ratio Dr to be equal to or less than the maximum rear wheel distribution ratio Drmax.

$$Dres=Tr^*/(Tf^*+Tr^*) \qquad (13)$$

$$Tr^*=Tf^*\cdot Drmax/(1-Drmax) \qquad (14)$$

Specifically, the required power Pe* is set (Step S270), the target rotational speed Ne* and the target torque Te* of the engine 22 are set (Step S280), the torque commands Tm1\*, Tm2\*, Tm3\* of the motors MG1, MG2, MG3 are set (Steps S290 to S330), and the target rotational speed Ne* and the target torque Te* of the engine 22 are transmitted to the engine ECU 24 while the torque commands Tm1\*, Tm2\*, Tm3\* of the motors MG1, MG2, MG3 are transmitted to the motor ECU 40 (Step S340) by the execution of the processing of Steps S270 to S340 thereafter. Then, this routine is terminated.

In the embodiment, the above-described control allows the front wheel upper limit torque Tfmax to become a value that is approximately equal to the front wheel balancing torque Tbf and the front wheel required torque Tf* to be limited by the front wheel upper limit torque Tfmax immediately after the occurrence of the idling-slip of the front wheels 38a, 38b. Accordingly, the front wheel slip velocity Vsf can be stabilized (converged) at a certain degree of value. Then, the front wheel upper limit torque Tfmax becomes a value that smoothly approximates the differential (Vsf*−Vsf) to Value 0 and the front wheel required torque Tf* is limited by the front wheel upper limit torque Tfmax. In this manner, the front wheel slip velocity Vsf is allowed to smoothly approximate the target front wheel slip velocity Vsf* and become stabilized (substantially constant) therearound. Likewise, the rear wheel upper limit torque Trmax becomes a value that is approximately equal to the rear wheel balancing torque Tbr and the rear wheel required torque Tr* is limited by the rear wheel upper limit torque Trmax immediately after the occurrence of the idling-slip of the rear wheels 38c, 38d. Accordingly, the rear wheel slip velocity Vsr can be stabilized (converged) at a certain degree of value. Then, the rear wheel upper limit torque Trmax becomes a value that smoothly approximates the differential (Vsr*−Vsr) to Value 0 and the rear wheel required torque Tr* is limited by the rear wheel upper limit torque Trmax. In this manner, the rear wheel slip velocity Vsr is allowed to smoothly approximate the target rear wheel slip velocity Vsr* and become stabilized (substantially constant) therearound. As a result, the sense of slip that is given to the driver can be improved.

Figure 9:
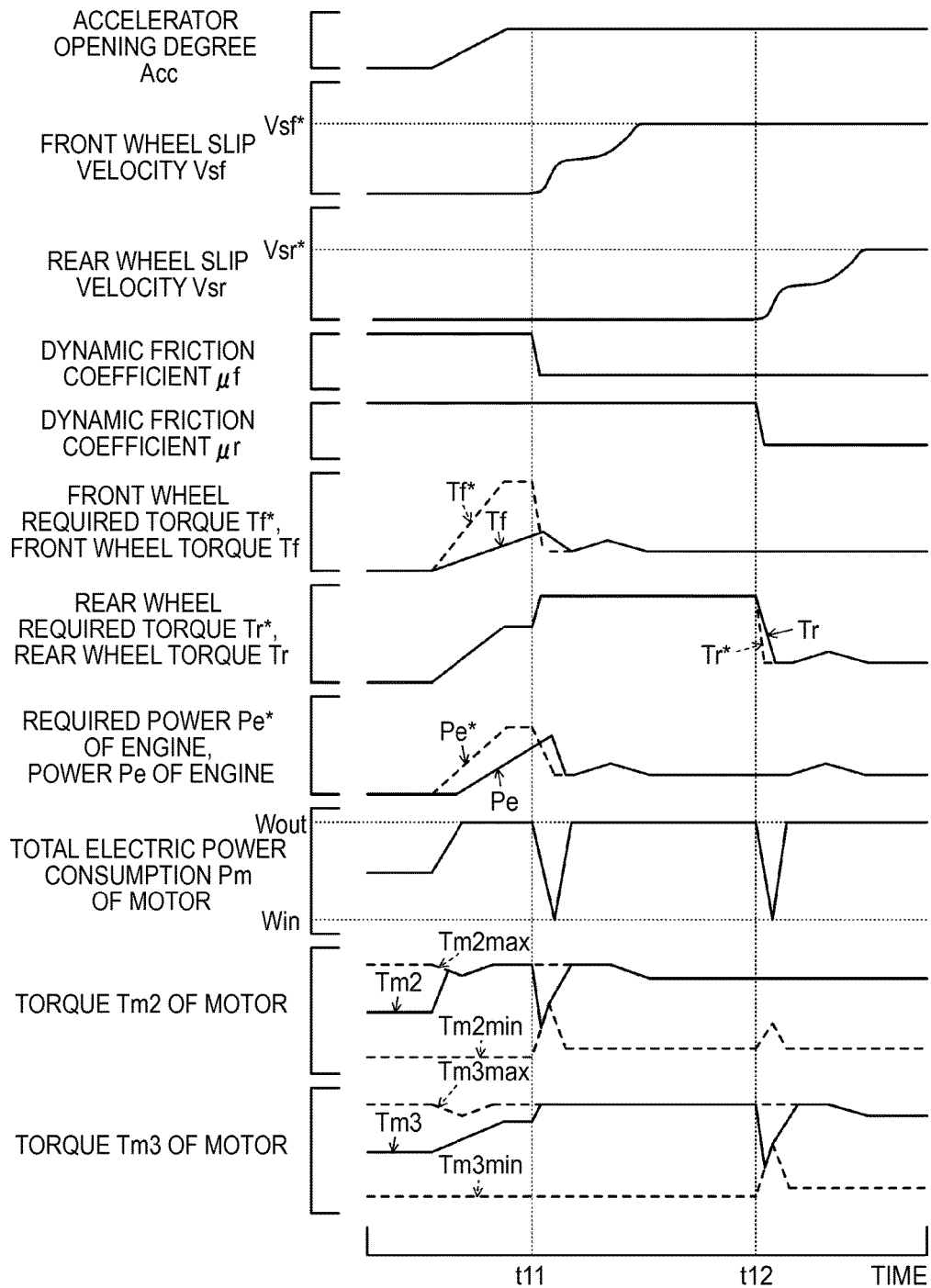
FIG. 9 is an explanatory drawing schematically illustrating how the embodiment changes over time when the absolute values of input and output limits Win, Wout of the battery 50 are equal to or less than a threshold Wref and a VSC OFF switch 89 is OFF.
Figure 10:
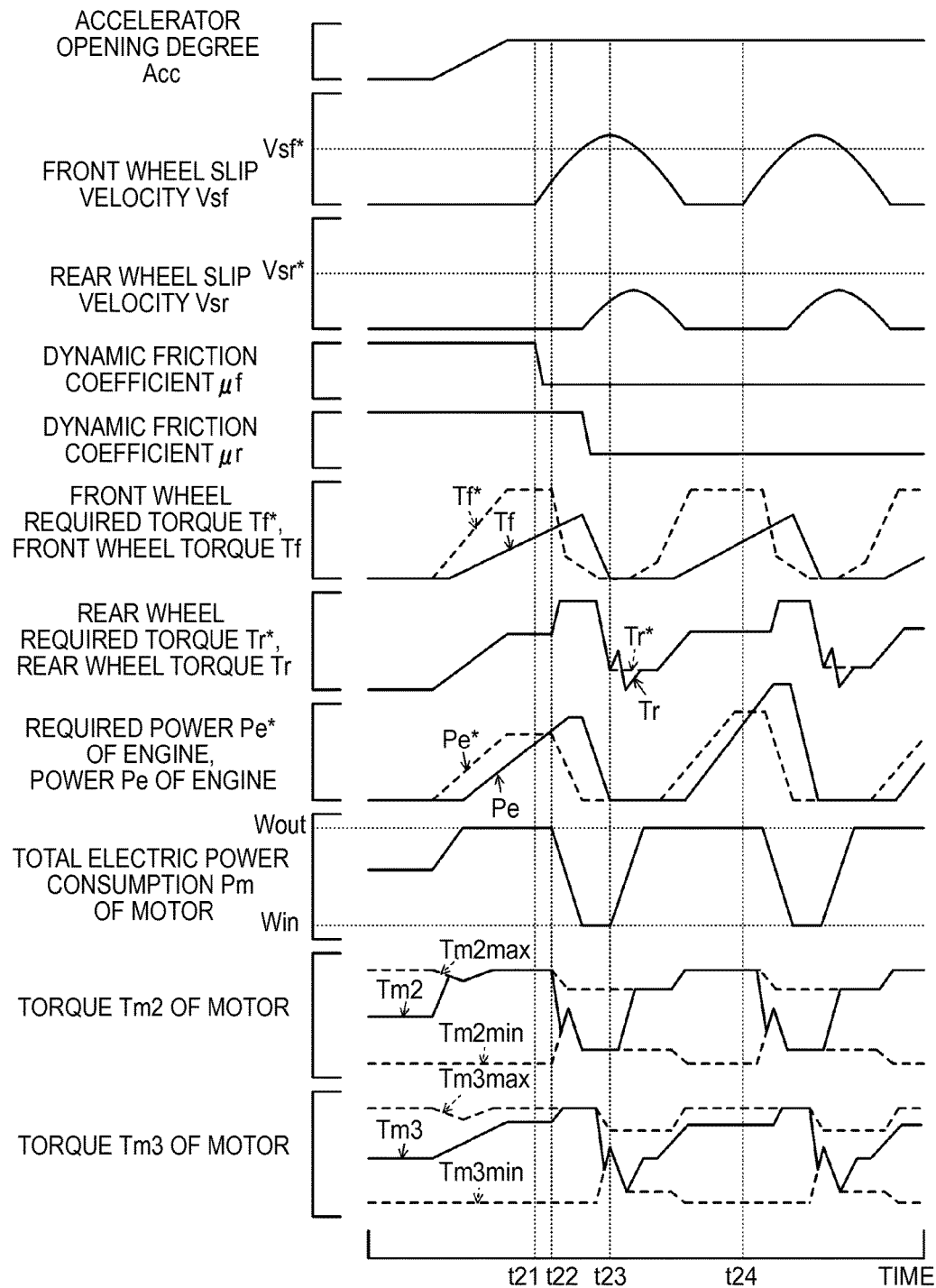
FIG. 10 is an explanatory drawing schematically illustrating how a comparative example changes over time when the absolute values of the input and output limits Win, Wout of the battery 50 are equal to or less than the threshold Wref and the VSC OFF switch 89 is OFF.

FIGS. 9 and 10 are explanatory drawings schematically illustrating how the accelerator opening degree Acc, the front wheel slip velocity Vsf, the rear wheel slip velocity Vsr, the dynamic friction coefficient μf between the front wheels 38a, 38b and the road surface, the dynamic friction coefficient μr between the rear wheels 38c, 38d and the road surface, the front wheel required torque Tf* and a front wheel torque Tf, the rear wheel required torque Tr* and a rear wheel torque Tr, the required power Pe* and the power Pe of the engine 22, the total electric power consumption Pm of the motors MG1, MG2, MG3, torque Tm2 and the torque limits Tm2min, Tm2max of the motor MG2, and torque Tm3 and the torque limits Tm3min, Tm3max of the motor MG3 change over time when the absolute values of the input and output limits Win, Wout of the battery 50 are equal to or less than the threshold Wref and the VSC OFF switch 89 is OFF.

FIG. 9 illustrates the embodiment while FIG. 10 illustrates a comparative example. As this comparative example, a case is assumed where comparative example control is performed so that the front wheel required torque Tf* is gradually reduced as a result of an increase in the value that is obtained by subtracting the target front wheel slip velocity Vsf* from the front wheel slip velocity Vsf(Vsf−Vsf*) and the rear wheel required torque Tr* is gradually reduced as a result of an increase in the value that is obtained by subtracting the target rear wheel slip velocity Vsr* from the rear wheel slip velocity Vsr(Vsr−Vsr*).

As illustrated in FIG. 10, in the case of this comparative example, the front wheel required torque Tf* is gradually reduced, while the required power Pe* of the engine 22 is gradually reduced in response, as a result of an increase in Value (Vsf−Vsf*) from time t22, when Value (Vsf−Vsf*) is increased to some extent, after the idling-slip of the front wheels 38a, 38b occurs at time t21. In this case, a reduction in the power Pe of the engine 22 is delayed because the engine 22 has a relatively low level of responsiveness, and an increase in the electric power consumption Pm1 of the motor MG1 (reduction in generated electric power) is delayed. The delay in the increase in the electric power consumption Pm1 of the motor MG1 and an increase in the rotational speed Nm2 of the motor MG2 cause the torque limit Tm2min to increase (absolute value decreasing, that is, approximating Value 0). This is to prevent the electric power that is input to the battery 50 from exceeding the input limit Win. In this case, the absolute value of the torque limit Tm2min may be excessively reduced in some cases because the absolute value of the input limit Win is assumed to be equal to or less than the threshold Wref. For these reasons, the torque Tm2 of the motor MG2 cannot become sufficiently low and the front wheel slip velocity Vsf overshoots the target front wheel slip velocity Vsf* in some cases. During an increase in the front wheel slip velocity Vsf, the absolute value of the torque limit Tm2max is also reduced as the rotational speed Nm2 of the motor MG2 increases.

Then, the front wheel required torque Tf* is increased as a result of a reduction in Value (Vsf−Vsf*) and the required power Pe* of the engine 22 is increased in response after the front wheel slip velocity Vsf reaches a peak at time t23 and then the front wheel slip velocity Vsf begins to be reduced. Since the engine 22 has a relatively low level of responsiveness, however, an increase in the power Pe of the engine 22 is delayed and a reduction in the electric power consumption Pm1 of the motor MG1 (increase in generated electric power) is delayed. The delay in the reduction in the electric power consumption Pm1 of the motor MG1 causes an increase in the torque limit Tm2max to be delayed as well. This torque limit Tm2max is determined to prevent the electric power that is output from the battery 50 from exceeding the output limit Wout. In this case, the absolute value of the torque limit Tm2max may be excessively reduced in some cases because the absolute value of the output limit Wout is assumed to be equal to or less than the threshold Wref. For these reasons, the torque Tm2 of the motor MG2 cannot become sufficiently high and the front wheel slip velocity Vsf undershoots the target front wheel slip velocity Vsf* in some cases to eventually lead to slip elimination.

When the idling-slip of the front wheels 38a, 38b occurs again at time t24, which follows the elimination of the idling-slip of the front wheels 38a, 38b, the front wheel slip velocity Vsf can overshoot and undershoot the target front wheel slip velocity Vsf* again based on the control according to the comparative example described above.

In the case of this comparative example, the front wheel slip velocity Vsf may repeatedly overshoot and undershoot the target front wheel slip velocity Vsf* as described above in some cases. In other words, the front wheel slip velocity Vsf may be unstable in some cases. FIG. 10 shows that the rear wheel slip velocity Vsr is unstable as is the case with the front wheel slip velocity Vsf although the rear wheel slip velocity Vsr does not overshoot the target rear wheel slip velocity Vsr*.

As illustrated in FIG. 9, in the case of the embodiment, the front wheel required torque Tf* is reduced by the front wheel upper limit torque Tfmax when the idling-slip of the front wheels 38a, 38b occurs at time t11. In the embodiment, the impact of the feedback term (integral term in particular) in Equation (10) is sufficiently small immediately after the initiation of the slip of the front wheels 38a, 38b, and thus the front wheel upper limit torque Tfmax becomes a value that is approximately equal to the front wheel balancing torque Tbf and the front wheel slip velocity Vsf can be converged to a certain degree of value by the front wheel required torque Tf* being limited by the front wheel upper limit torque Tfmax. In the embodiment, the front wheel required torque Tf* begins to be reduced and the required power Pe* of the engine 22 also begins to be reduced immediately after the initiation of the slip of the front wheels 38a, 38b (when the front wheel slip velocity Vsf is not too high), and thus the torque Tm2 of the motor MG2 can be reduced before the torque limit Tm2min increases to some extent (absolute value decreasing to some extent) in comparison to the comparative example. Accordingly, the torque Tm2 of the motor MG2 can be sufficiently reduced and the front wheel slip velocity Vsf can be inhibited from overshooting the target front wheel slip velocity Vsf*. In the embodiment as well as the comparative example, the absolute value of the torque limit Tm2min is reduced by a delay in an increase in the electric power consumption Pm1 of the motor MG1 (reduction in generated electric power) and an increase in the rotational speed Nm2 of the motor MG2, and thus the increase in the rotational speed Nm2 of the motor MG2 causes the absolute value of the torque limit Tm2max to decrease.

Then, the impact of the feedback term (integral term in particular) in Equation (10) increases and the front wheel upper limit torque Tfmax becomes a value that approximates the differential (Vsf*−Vsf) to Value 0. Then, the front wheel required torque Tf* is limited by the front wheel upper limit torque Tfmax and the front wheel slip velocity Vsf is allowed to smoothly approximate the target front wheel slip velocity Vsf* and become substantially constant therearound. In this case, the front wheel upper limit torque Tfmax is smoothly changed by the impact of the feedback term (integral term in particular), and thus the front wheel slip velocity Vsf is allowed to approximate the target front wheel slip velocity Vsf* without causing inconvenience attributable to a response delay of the engine 22.

This control can inhibit the front wheel slip velocity Vsf from overshooting or undershooting the target front wheel slip velocity Vsf*. In other words, the front wheel slip velocity Vsf can be stabilized around the target front wheel slip velocity Vsf*.

When the idling-slip of the rear wheels 38c, 38d occurs at time t12, the rear wheel slip velocity Vsr can be inhibited from overshooting or undershooting the target rear wheel slip velocity Vsr* by the rear wheel required torque Tr* being changed as the front wheel required torque Tf* being changed when the idling-slip of the front wheels 38a, 38b occurs. In other words, the rear wheel slip velocity Vsr can be stabilized around the target rear wheel slip velocity Vsr*.

According to the hybrid car 20 of the embodiment described above, the front wheel required torque Tf* begins to be reduced and the required power Pe* of the engine 22 also begins to be reduced immediately after the initiation of the slip of the front wheels 38a, 38b (when the front wheel slip velocity Vsf is not too high) in a case where the idling-slip of the front wheels 38a, 38b occurs when the VSC OFF switch 89 is ON. Accordingly, the front wheel slip velocity Vsf can be inhibited from overshooting the target front wheel slip velocity Vsf*. Then, the front wheel slip velocity Vsf can be stabilized at a certain degree of value since the front wheel required torque Tf* is set within a range that is equal to or less than the front wheel upper limit torque Tfmax based on the front wheel balancing torque Tbf commensurate with the dynamic frictional force between the front wheels 38a, 38b and the road surface. Likewise, the rear wheel required torque Tr* begins to be reduced immediately after the initiation of the slip of the rear wheels 38c, 38d when the idling-slip of the rear wheels 38c, 38d occurs, and thus the rear wheel slip velocity Vsr can be inhibited from overshooting the target rear wheel slip velocity Vsr* and the rear wheel slip velocity Vsr can be stabilized at a certain degree of value since the rear wheel required torque Tr* is set within a range that is equal to or less than the rear wheel upper limit torque Trmax based on the rear wheel balancing torque Tbr commensurate with the dynamic frictional force between the rear wheels 38c, 38d and the road surface. As a result, the sense of slip that is given to the driver can be improved.

The front wheel slip velocity Vsf is allowed to approximate the target front wheel slip velocity Vsf* and be stabilized therearound since the sum of the front wheel balancing torque Tbf and the feedback term for canceling the differential (Vsf*−Vsf) between the target front wheel slip velocity Vsf* and the front wheel slip velocity Vsf is set to the front wheel upper limit torque Tfmax. Likewise, the rear wheel slip velocity Vsr is allowed to approximate the target rear wheel slip velocity Vsr* and be stabilized therearound since the sum of the rear wheel balancing torque Tbr and the feedback term for canceling the differential (Vsr*−Vsr) between the target rear wheel slip velocity Vsr* and the rear wheel slip velocity Vsr is set to the rear wheel upper limit torque Trmax. As a result, the sense of slip that is given to the driver can be improved.

In the hybrid car 20 according to the embodiment, the engine 22 and the motors MG1, MG2 are controlled with the front wheel required torque Tf* set within a range that is equal to or less than the front wheel upper limit torque Tfmax based on the front wheel balancing torque Tbf when the VSC OFF switch 89 is ON, the absolute values of the input and output limits Win, Wout of the battery 50 are equal to or less than the threshold Wref, and the idling-slip of the front wheels 38a, 38b occurs. However, the engine 22 and the motors MG1, MG2 may also be controlled as in the embodiment with the front wheel required torque Tf* set within the range that is equal to or less than the front wheel upper limit torque Tfmax based on the front wheel balancing torque Tbf when the absolute values of the input and output limits Win, Wout of the battery 50 exceed the threshold Wref and the idling-slip of the front wheels 38a, 38b occurs. Also, the control according to the comparative example described above may be performed insofar as the front wheel slip velocity Vsf is assumed not to overshoot or undershoot the target front wheel slip velocity Vsf* even when the control according to the comparative example described above is performed when the absolute values of the input and output limits Win, Wout of the battery 50 exceed the threshold Wref and the idling-slip of the front wheels 38a, 38b occurs. In view of travelability and postural stability, it is preferable that control similar to that performed when the idling-slip of the front wheels 38a, 38b occurs is performed when the idling-slip of the rear wheels 38c, 38d occurs.

In the hybrid car 20 according to the embodiment, the proportional term and the integral term are used in the feedback term for canceling the differential (Vsf*−Vsf) pertaining to a case where the idling-slip of the front wheels 38a, 38b occurs. However, the integral term may be used alone instead. In the embodiment, the proportional term and the integral term are used in the feedback term for canceling the differential (Vsr*−Vsr) pertaining to a case where the idling-slip of the rear wheels 38c, 38d occurs. However, the integral term may be used alone instead.

When the idling-slip of the front wheels 38a, 38b occurs in the hybrid car 20 according to the embodiment, the sum of the front wheel balancing torque Tbf and the feedback term for canceling the differential (Vsf*−Vsf) is set to the front wheel upper limit torque Tfmax. However, the front wheel balancing torque Tbf may be set to the front wheel upper limit torque Tfmax instead. Even in this case, the front wheel slip velocity Vsf can be stabilized at a certain degree of velocity. In the embodiment, the sum of the rear wheel balancing torque Tbr and the feedback term for canceling the differential (Vsr*−Vsr) is set to the rear wheel upper limit torque Trmax when the idling-slip of the rear wheels 38c, 38d occurs. However, the rear wheel balancing torque Tbr may be set to the rear wheel upper limit torque Trmax instead. Even in this case, the rear wheel slip velocity Vsr can be stabilized at a certain degree of velocity.

In the hybrid car 20 according to the embodiment, the estimated output torque Teest of the engine 22 is set by performing the response delay compensation (dead time compensation and primary delay compensation) on the target torque Te* of the engine 22 that is set during the current execution of the driving control routine at VSC OFF. However, the estimated output torque Teest of the engine 22 may also be calculated based on the following Equation (15) and by the use of the torque command (previous Tm1*) of the motor MG1 and the gear ratio ρ of the planetary gear 30 that are set during the execution of the previous driving control routine at VSC OFF.

$$Teest=-(1+\rho)\cdot\text{previous } Tm1^*/\rho \qquad (15)$$

When the idling-slips of the front wheels 38a, 38b and the rear wheels 38c, 38d occur in the hybrid car 20 according to the embodiment and the assumed rear wheel distribution ratio Dres calculated by the use of the front wheel required torque Tf* and the rear wheel required torque Tr* exceeds the maximum rear wheel distribution ratio Drmax, the rear wheel required torque Tr* is reset so that the front wheel distribution ratio and the rear wheel distribution ratio become Value (1−Drmax) and the maximum rear wheel distribution ratio Drmax, respectively. However, the resetting of the rear wheel required torque Tr* may not be performed as well.

The hybrid car 20 according to the embodiment is provided with the engine 22 and the motor MG1 that are connected to the driving shaft 36F, which is connected to the front wheels 38a, 38b, via the planetary gear 30, the motor MG2 that is connected to the driving shaft 36F, and the motor MG3 that is connected to the driving shaft 36R which is connected to the rear wheels 38c, 38d. However, the hybrid car 20 according to the embodiment may not be provided with the motor MG3. In other words, the hybrid car 20 according to the embodiment may be a 2WD hybrid car instead of a 4WD hybrid car.

Hereinafter, a correspondence relationship between the main elements of the embodiment and the main elements of the invention described in the SUMMARY OF THE INVENTION will be described. The engine 22 according to the embodiment corresponds to the "engine", the motor MG1 according to the embodiment corresponds to the "first motor", the planetary gear 30 according to the embodiment corresponds to the "planetary gear", the motor MG2 according to the embodiment corresponds to the "second motor", the battery 50 according to the embodiment corresponds to the "battery", and the HVECU 70, the engine ECU 24, and the motor ECU 40 according to the embodiment correspond to the "control means".

The invention can be used in a hybrid car manufacturing industry and the like.

What is claimed is:

1. A hybrid car comprising:
an engine;
a first motor configured to input and output power;
a first driving shaft connected to a first drive wheel of the hybrid car;
a planetary gear including three rotating elements, the three rotating elements each being connected to a rotary shaft of the first motor, an output shaft of the engine, and the first driving shaft such that the three rotating elements are arranged in an order of the rotary shaft of the first motor, the output shaft of the engine, and the first driving shaft in a nomogram of the planetary gear;
a second motor configured to input and output power to and from the first driving shaft;
a battery configured to exchange electric power with the first motor and the second motor; and
an electronic control unit configured to control the first motor and the second motor such that the hybrid car travels within a range of allowable input and output electric power of the battery, the electronic control unit being configured to set a first upper limit driving force based on a first balancing driving force commensurate with a dynamic frictional force between the first drive wheel and a road surface and control the engine, the first motor, and the second motor when an idling-slip of the first drive wheel occurs such that a driving force equal to or less than the first upper limit driving force is output to the first drive wheel.

2. The hybrid car according to claim 1,
wherein the electronic control unit is configured to set a sum of the first balancing driving force and a first correction driving force as the first upper limit driving force when the idling-slip of the first drive wheel occurs, the first correction driving force being a driving force at which a first slip differential as a differential between a target slip velocity and a current slip velocity of the first drive wheel is canceled.

3. The hybrid car according to claim 1,
wherein the electronic control unit is configured to control the engine, the first motor, and the second motor when an absolute value of the allowable input and output electric power is equal to or less than a predetermined value and the idling-slip of the first drive wheel occurs such that a driving force equal to or less than the first upper limit driving force is output to the first drive wheel.

4. The hybrid car according to claim 1, further comprising:
a third motor configured to input and output power to and from a second driving shaft connected to a second drive wheel other than the first drive wheel,
wherein the battery is configured to exchange electric power with the third motor, and
wherein the electronic control unit is configured to control the engine, the first motor, the second motor, and the third motor such that the hybrid car travels within a range of maximum allowable input and output electric power of the battery, the electronic control unit being configured to set a second upper limit driving force based on a second balancing driving force commensurate with a dynamic frictional force between the second drive wheel and the road surface and control the third motor when an idling-slip of the second drive wheel occurs such that a driving force equal to or less than the second upper limit driving force is output to the second drive wheel.

5. The hybrid car according to claim 4, wherein the electronic control unit is configured to set a sum of the second balancing driving force and a second correction driving force as the second upper limit driving force when the idling-slip of the second drive wheel occurs, the second correction driving force being a driving force at which a second slip differential as a differential between a target slip velocity and a current slip velocity of the second drive wheel is canceled.

6. The hybrid car according to claim 4, wherein the electronic control unit is configured to control the third motor when an absolute value of the allowable input and output electric power is equal to or less than a predetermined value and the idling-slip of the second drive wheel occurs such that a driving force equal to or less than the second upper limit driving force is output to the second drive wheel.

7. The hybrid car according to claim 4, wherein the electronic control unit is configured to control the engine, the first motor, the second motor, and the third motor when the idling-slip occurs in any one or both of the first drive wheel and the second drive wheel such that a distribution ratio regarding torque of the first drive wheel and torque of the second drive wheel is within an allowable range.

* * * * *